United States Patent

[11] 3,588,799

| [72] | Inventor | Kenneth W. Gross<br>Forrest Hills, N.Y. |
|---|---|---|
| [21] | Appl. No. | 858,019 |
| [22] | Filed | Sept. 15, 1969 |
| [45] | Patented | June 28, 1971 |
| [73] | Assignee | The United States of America as represented by the Secretary of the Navy |

[54] ZONED ARRAY SONAR SYSTEM
5 Claims, 4 Drawing Figs.

[52] U.S. Cl....................................................... 340/6, 340/16
[51] Int. Cl........................................................ G01s 3/00

[50] Field of Search............................................ 340/5, 6, 16, 8, 9

[56] References Cited
UNITED STATES PATENTS
3,277,451  10/1966  Parssinen ..................... 340/6X

*Primary Examiner*—Richard A. Farley
*Attorneys*—L. A. Miller, Q. E. Hodges, A. Sopp and R. F. Sandler ABSTRACT: A slope filtering arrangement for a zoned array sonar system using RC networks and appropriate inverters. The different zones are provided with different frequency responses without significant phase discrepancies between the various signal processing channels provided for the zones.

Patented June 28, 1971
3,588,799
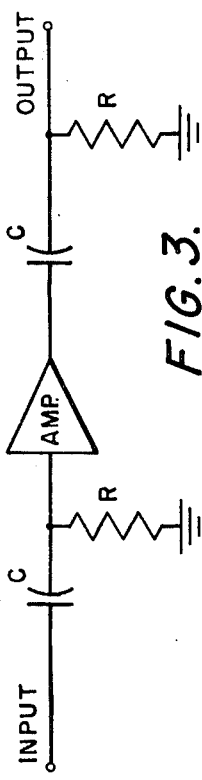
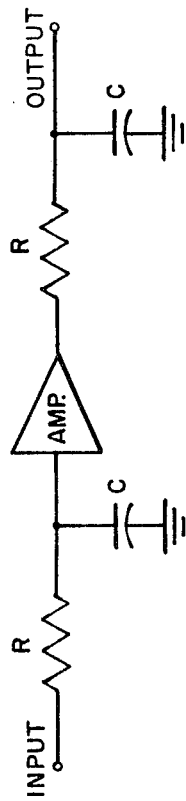
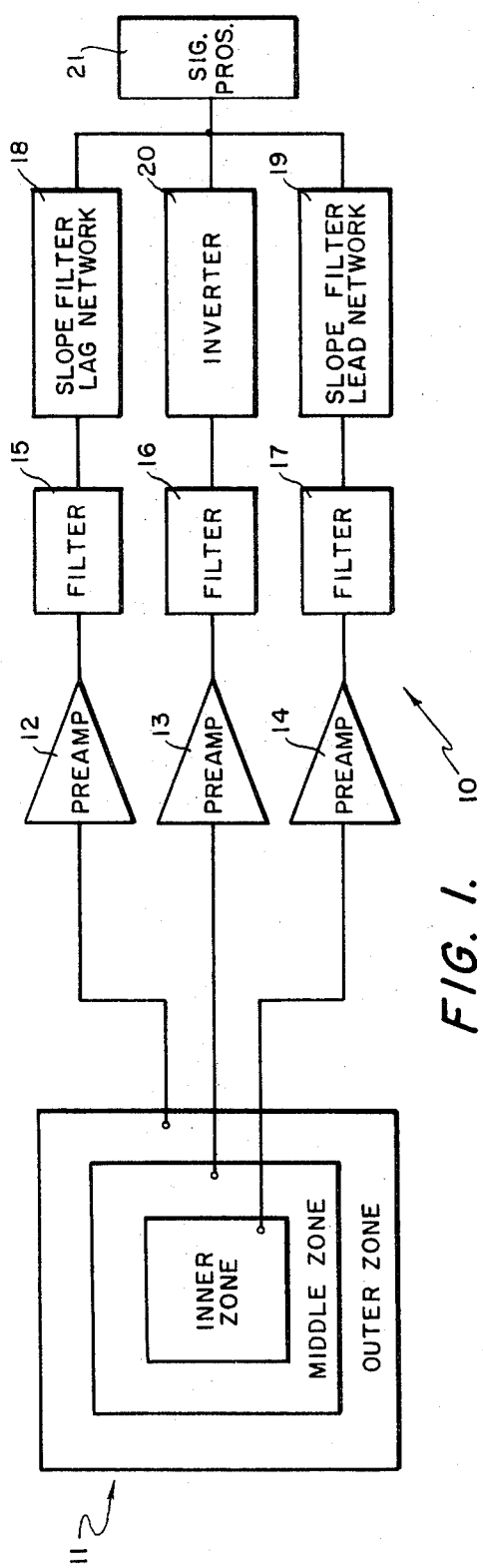
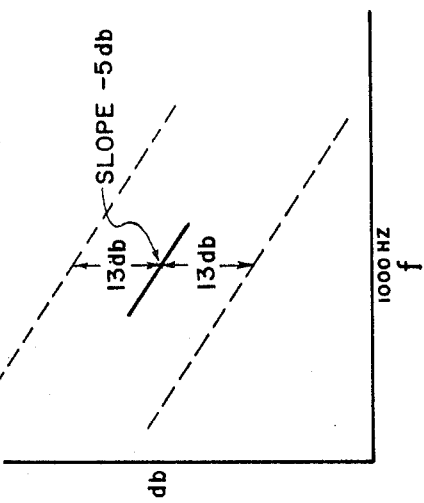
INVENTOR
KENNETH W. GROSS
BY
ATTORNEYS

ZONED ARRAY SONAR SYSTEM

BACKGROUND OF THE INVENTION

The present invention relates to improvements in sonar systems and more particularly pertains to a new and improved slope filtering arrangement for a zoned array sonar system.

In the field of sonar, prior art array systems have been constructed which employ a number of sonic information sensors and a number of signals processing channels. Any array of receiving or transmitting elements, such as hydrophones in an array, has the inherent characteristic that its beamwidth varies inversely with the array dimensions for the following reasons. For any one given direction, a beam is formed by bringing the signals from the various hydrophones into phase, which places their sum at a maximum. Because they are transmitted via a radial wave front, any signals originating from a position angularly displaced from the given direction, i.e. the beam, will arrive at the various hydrophones in the array at different times and, therefore, at any provided point of summation at a different time, or phase, than those signals within the beam. The time difference will depend upon the hydrophone locations from which they originate. The greater the separation between array elements, the greater are the time differences between the signal arrival at these points and therefore the greater the reduction in the resultant instantaneous sum. Hence, for a particular angular difference, the loss in the sum is greater for a larger array. This more rapid fall-off in amplitude is equivalent to a sharper beamwidth for a larger array. Another way of viewing this property of an array is that as the frequency increases, an array of constant size will encompass an increasing number of wavelengths, and hence a decreasing beamwidth.

In a passive sonar system such as disclosed herein, it is desirable to achieve a broadband operating characteristic, i.e. accept and operate on signals over a wide frequency range, and, in such a case, the beamwidth of the system must be substantially independent of frequency. A zoned array is known to accomplish this by synthetically causing the effective array dimensions to decrease proportionally with frequency. A method of accomplishing this result would be to provide each element with a low-pass filter whose cutoff frequency is inversely proportional to the distance of the sensing element from the center of the array. To simplify such a system, all elements in a zone would receive the same type of filter, hence the name "zoned array."

Implementing the zoned array concept using low-pass filters of conventional design, however, leads to unsatisfactory results because the filters have widely varying phase shifts over their response band. If different elements are then provided with different cutoff frequencies, phase discrepancies between channels result. The present invention has avoided the varying phase shift problems produced by the conventional band-pass filter arrangement.

Accordingly, it is an object of the present invention to provide an improved zoned array sonar system.

Another object is to provide an improved filtering arrangement for processing sonar signals.

A further object of the invention is the provision of a slope filtering arrangement for a zoned array sonar system.

Still another object is to provide a signal processing arrangement whereby objectionable signal errors, introduced by band-pass filters, are eliminated.

A still further object is the provision of a constant beamwidth sonar array which is relatively independent of frequency.

A still another object is to provide improved underwater listening equipment capable of passive search, detection, and continuous tracking of noise sources in terms of both azimuth and depression angles.

Other objects and advantages, as well as the exact nature of the invention, will be readily apparent to those skilled in the art from the consideration of the following disclosure of the invention.

SUMMARY OF THE INVENTION

The present invention accomplishes the above-cited objects by providing a zoned array sonar system which eliminates the deleterious effects of widely varying phase shifts caused by the use of conventional band-pass filters in the signal processing channels of such systems. The conventional filters, according to the present invention, are replaced by slope filters. These are not conventional tuned filters, but rather slope networks of resistors and capacitors which have suitable combinations of rising and falling slopes, hence the term "slope filter." By using such filters and inverters to reverse phase, as required, different zones may be provided with different frequency responses without significant phase discrepancies between channels. The array, while not decreasing in size with increasing frequency in an exact sense because the filter cutoff is not particularly sharp, does approximate such a function because these filters provide suitable weighting of the zones as a function of frequency.

BRIEF DESCRIPTION OF THE DRAWINGS

FIG. 1 is a block diagram of a preferred embodiment of the invention.

FIG. 2 is a curve representing the characteristic of the acoustic signals under consideration.

FIG. 3 is a schematic diagram of the slope filter lead network illustrated in FIG. 1.

FIG. 4 is a schematic diagram of the slope filter lag network illustrated in FIG. 1.

DESCRIPTION OF THE PREFERRED EMBODIMENT

Referring now to the drawings, and FIG. 1 in particular, there is shown a block diagram 10 of the preferred embodiment of a zoned array sonar system according to the teachings of this invention. In an operational system, a large number of transducer elements would be provided in each zone, each element having its own signal processing channel consisting of a preamplifier, a band-pass filter and one lead network, lag network, or inverter. The output signals from each signal processing channel would then be coupled together for further signal processing. The transducers are intended to be used passively but could also have an active capability. The transducer array, hydrophones for example, may be mounted in any underwater position, on any type of vehicle, on a buoy, or on the bottom of the body of water. The array and its support may be surrounded by a protective housing of, for instance, steel, rubber or plastic.

In FIG. 1 the representative hydrophones are indicated as lying within three representative zones, such being the zoned array 11. The hydrophones are usually arranged in accordance with some orderly system. In the particular case of the zoned array described herein, for reasons hereinafter given, the hydrophones in the inner zone are spaced more closely than those in the middle zone, and those in the middle zone are spaced more closely than those in the outer zone. A practical system might have approximately a hundred or more hydrophones in the entire three zone array. The hydrophones will pick up the various acoustic signals sensed in their respective zones. As shown in FIG. 2, in the passive sonar application being considered, the acoustic signals, on a statistical basis, will most likely be broadband noise with a typical spectrum value of $-42$ db./microbar/Hz. at 1,000 Hz. and a slope of $-5$ db./octave with a spread about this mean value of about $\pm 13$ db. Of course, there will be considerable variations in the spectrum depending on the sea state condition. The output of a typical hydrophone under average conditions at 1,000 Hz. is likely to be about $-88$ db./volt for an acoustic input of 1 microbar (dyne/cm.$^2$) and it is these figures that each of the signal processing channels is designed around in that the signals from the hydrophones, with an order of magnitude and bandwidth as indicated, must be amplified, operated upon in a manner to be later described, and then presented as information in an intelligible form clearly indicating acoustic energy reception at given positions.

As shown, the outputs of three representative hydrophones, one in each zone, are fed into their associated preamplifiers 12, 13, 14 which are provided for the purpose of amplification. All the preamplifiers of the system have the same gain, which would be in the range of 40 db. to 70 db., typically 60 db., and their bandwidth is significantly larger than the remainder of the system and will, therefore, have no effect on the overall system bandwidth. The signals from the respective preamplifiers 12, 13, 14 are then fed into band-pass filters 15, 16, 17, typically 1 to 2 octaves wide and centered about the design frequency of the array, for example 1 kHz. These filters have substantially no loss within their frequency bands. The purpose of the filters 15, 16, 17 is to establish the system bandwidth, which is usually a compromise figure chosen to provide the best reception of signals of interest considering the necessary rejection of background or interfering noise.

The band-pass filter outputs are thereafter fed into the networks that set the system apart from the prior art, i.e., a slope filter lag network 18, a slope filter lead network 19, and an inverter 20. It should be emphasized that all of the hydrophones of an operational system in the middle zone will connect to signal processing channels employing inverters whose function will be to provide signal inversion without gain or loss, those in the outer zone are connected to channels employing slope filter networks and those in the inner zone are connected to channels employing slope filter lead networks.

FIGS. 3 and 4 are the schematic diagrams of the slope filter lag and lead networks (indicated as 18 and 19, respectively, in FIG. 1). No particular component values are specified because the impedance levels are an arbitrary function of design choice and the break frequencies of these networks will be dependent on the design frequency band of the array and the overall system. The break frequency ($1/2\pi RC$) of both the lead and lag networks should be considerably higher and lower, respectively, than the highest and lowest frequencies of interest.

Basically, the lead network 19 will shift the phase of its received signal forward by 180° and introduces a +12 db./octave slope for frequencies significantly below the break frequency while the lag network 18 will shift the phase of its received signal backward by 180° and introduces a −12 db./octave slope for all frequencies significantly above the break frequency. The inverter 21 will reverse the phase of the incoming signal without change of amplitude nor phase shift across the entire band of frequencies of interest.

Because the steady-state results of shifting the phase forward or backward by 180° or inverting the signal without phase shift are identical, the three networks 18, 19, 20 permit −12 db./octave, 0 db./octave or +12 db./octave, respectively, to be achieved without any phase differences of any consequence. Referring again to FIGS. 3 and 4, it should be noted that amplification is provided so that all three of the networks 18, 19, 20 will have the same gain in the middle of the frequency band of interest.

As previously stated, because the slope filter networks do not have a sharp cutoff, suitable weighting of the zones in terms of frequency must be provided in order to achieve an approximately uniform beamwidth array, in other words, an array which decreases in size with increasing frequency so that the beamwidth is independent of frequency. The proper weighting, in order to achieve an approximately uniform beamwidth over at least 1 octave is achieved by changing the hydrophone densities in each of the zones. The hydrophone density ratios for example may be 4:2:1 with respect to the inner, middle and outer zones, in that order. This effect of zone density weighting can be illustrated by considering the operation of such a system at three frequencies, a middle frequency $f$, a frequency $f$ plus ½ octave above $f$ or $1.4f$, and a frequency $f$ minus ½ octave below $f$ or $.7f$. The relative response of each zone at each frequency is determined by the slope filter network or inverter output associated with the particular zone considered and the hydrophone densities in that zone. In other words, the effective density of the array is determined by multiplying the network output or gains by the actual relative density in each of the three zones, as shown in the following chart:

| Actual relative zone densities of hydrophones | Relative voltage gains due to slope filters and inverters at: | | | Effective density of the array zones | | |
|---|---|---|---|---|---|---|
| | .7f | f | 1.4f | .7f | f | 1.4f |
| Inner zone........ 4 | .5 | 1 | 2 | 2 | 4 | 8 |
| Middle zone........ 2 | 1 | 1 | 1 | 2 | 2 | 2 |
| Outer zone........ 1 | 2 | 1 | .5 | 2 | 1 | .5 |

It is, therefore, evident that the effective density of the array is uniform for all three zones at the lowest frequency of interest ($0.7f$) and that the beamwidth is determined at this frequency by the dimensions of the array rather than the frequency At the highest frequency of interest ($1.4f$) the variation if effective density is so great throughout the three zones that it is clear that the middle and outer zones have negligible effect. Since the inner zone's effect is so great, the beamwidth of the array is determined by the dimensions of the inner zone itself. The frequency at the highest frequency of interest ($1.4f$) is twice the lowest frequency of interset ($0.7f$) is twice the lowest frequency of interest ($0.7f$) and so, by making the inner zone with half of the dimensions of the total array, the beamwidth becomes the same at both frequencies. At the frequency $f$, essentially the inner and middle zones contribute with the effects of the outer zone becoming negligible and hence the outer edge of the middle zone should be 0.7 or 70 percent of the overall size of the total array.

Referring again to FIG. 1, the outputs of the networks 18, 19, 20 are coupled together to the final signal processing stage 21 which will provide the functions of beam forming, signal enchancement, and signal display.

The beam forming function relates to taking the output signals from all the lead, lag, and inverter networks and electronically operating on them in such a fashion that a substitution for mechanical scanning is provided. Such may be accomplished in a conventional fashion such as by taking the slope filter and inverter signals, placing each in a tapped delay line, and then selecting one tap in each delay line corresponding to a beam oriented in a given direction so that the electrical delay in the delay line matches the relative acoustic delay to the hydrophone associated with the delay line. The signals taken at these selected taps for all the delay lines are then summed, so that for a signal at the center of the beam formed by the selection of these taps, all the hydrophone signals sum substantially in phase, and for signals from all other directions, they sum out of phase. Other taps are selected and other summing networks are provided for the other desired beams.

Signal enhancement is provided by the use of a conventional signal accumulator or integrator, prior to display, to reduce the effect of random fluctuations on the display, to reduce the effect of random fluctuations on the display which would, perhaps, display such intensity (brightness) modulations. The display could be one of many known devices, typically of the paper recorder or cathode-ray tube type, where the information format is most logically a plot of bearing versus time.

What has been disclosed is a zoned array sonar system displaying many improved characteristics. The use of the slope networks, as described, allows the implementation of a zoned array with a constant beamwidth over a wide frequency band and thereby eliminating the need for different band-pass filters for each zone which would result in substantial phase discrepancies.

It should be understood, of course, that the foregoing disclosure relates only to a preferred embodiment of the invention and that numerous modifications may be made therein.

I claim:
1. In a zoned array sonar system having:
a plurality of transducers;

at least three signal processing channels, each having input and output connections and amplification and filtering means, each of said signal processing channels connected at its input connection to one of said transducers and connected at its output connection to a means for summing signals in said channels; and the combination therewith of an inverter in at least one of said signal processing channels, a slope filter lead network in at least another one of said signal processing channels, and a slope filter lag network in at least still another one of said signal processing channels.

2. In the zoned array sonar system of claim 1, said transducers being a large number of hydrophones, a plurality of which are connected to a like number of signal processing channels with inverters, another plurality of which are connected to a like number of signal processing channels with slope filter lead networks, and still another plurality of which are connected to a like number of signal processing channels with slope filter lag network, the means for summing connected in turn to an electronic means for beam forming.

3. In the zoned array sonar system of claim 2, said means for summing also connected to an electronic signal enhancement means.

4. In the zoned array sonar system of claim 2, said pluralities of hydrophones connected to signal processing channels with inverters, slope filter lead networks, and slope filter lag networks, respectively, being in the relative density ratio of approximately 2:4:1, respectively.

5. In the zoned array sonar system of claim 1, said means for summing including a plurality of predetermined delay means.